B. R. BENJAMIN.
COMBINED HARVESTER AND THRESHER.
APPLICATION FILED MAY 1, 1913.

1,222,716.

Patented Apr. 17, 1917.
4 SHEETS—SHEET 1.

Witnesses:
F. W. Hofmeister
H. L. Eckel

Inventor:
Bert R. Benjamin,
By Chas. E. Lord
Atty.

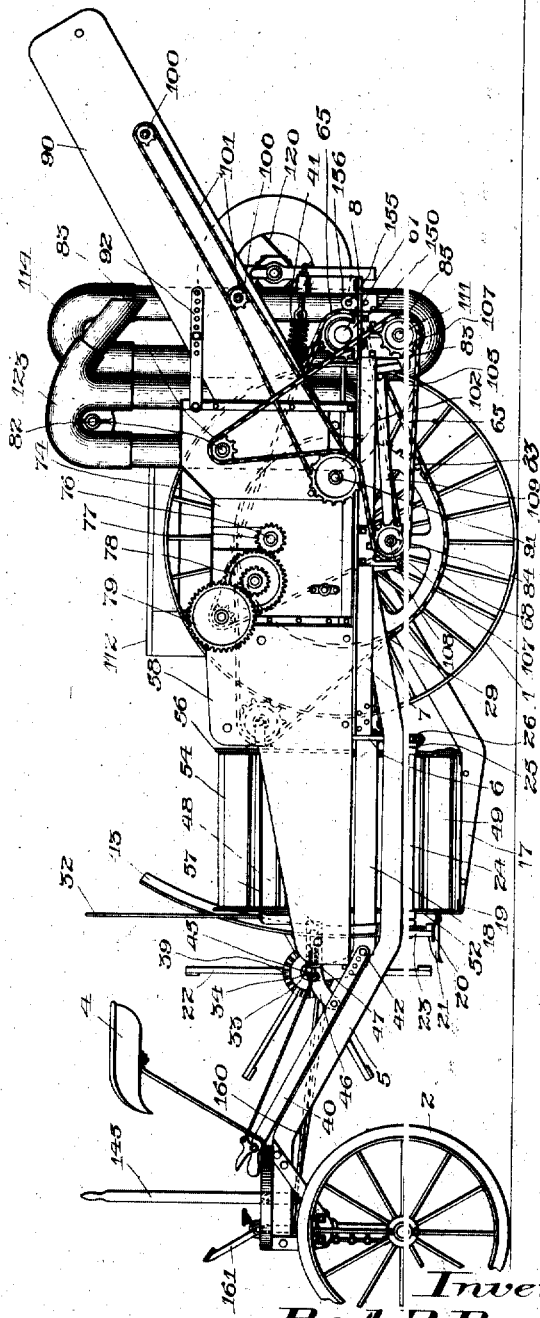

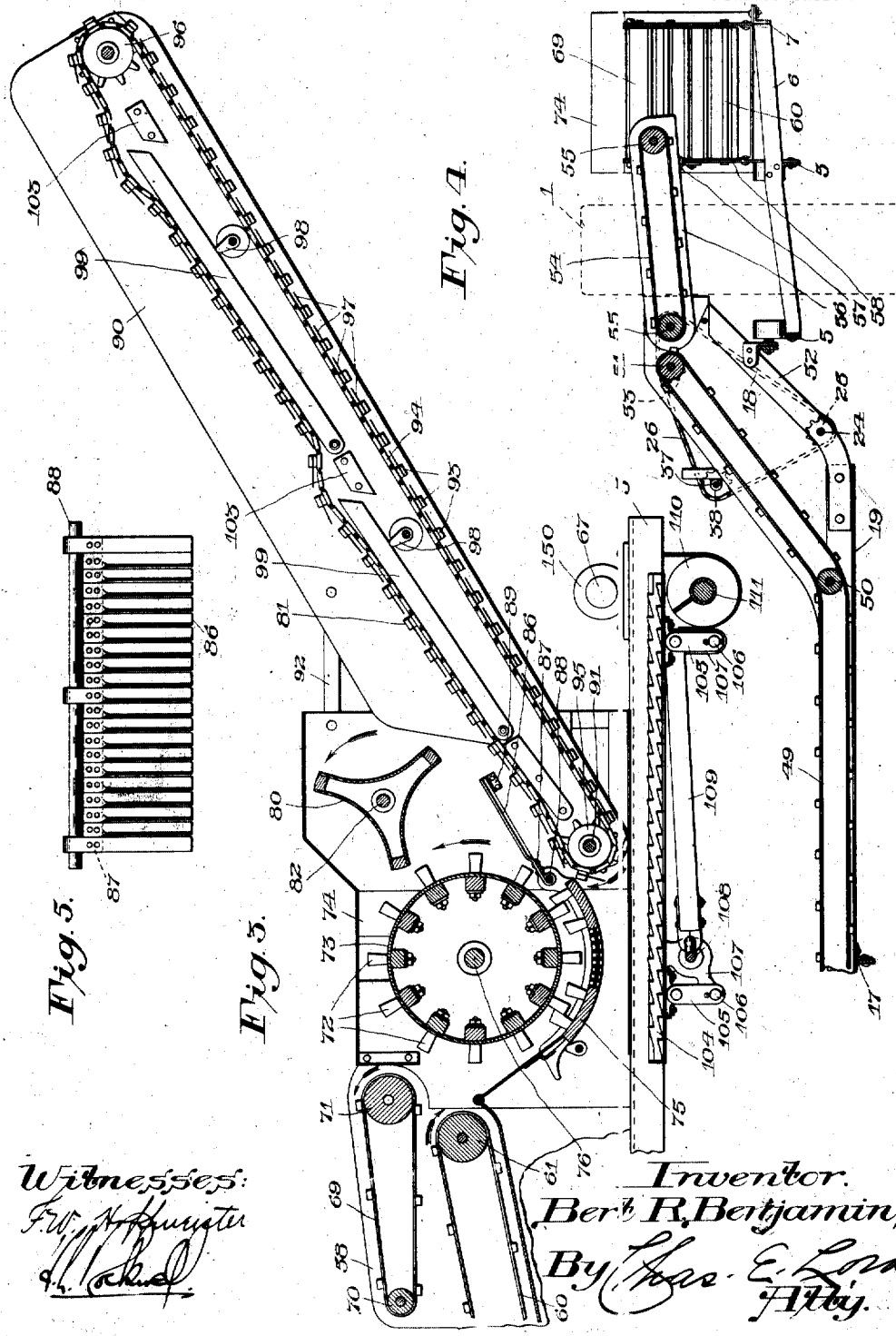

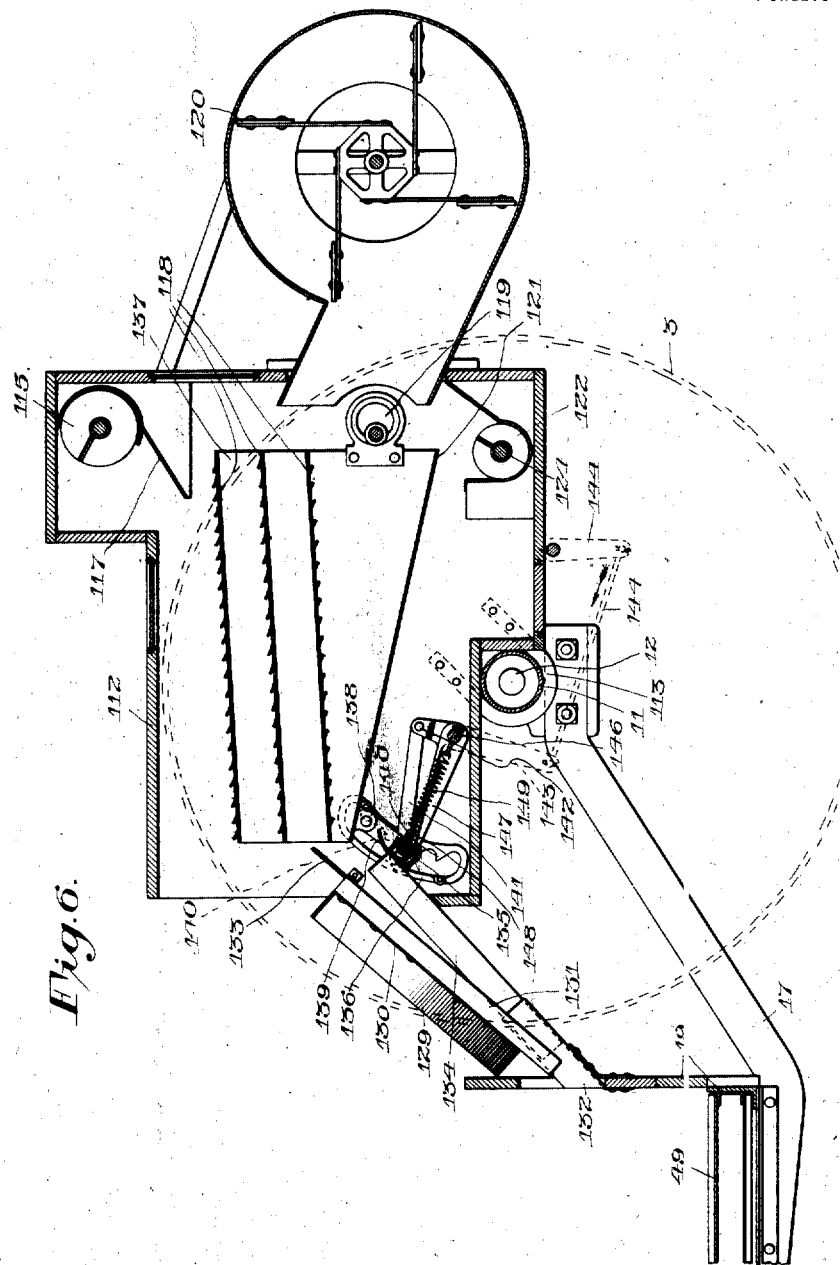

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

COMBINED HARVESTER AND THRESHER.

1,222,716.  Specification of Letters Patent.  Patented Apr. 17, 1917.

Application filed May 1, 1913. Serial No. 764,803.

*To all whom it may concern:*

Be it known that I, BERT R. BENJAMIN, a citizen of the United States, residing at Oak Park, in the county of Cook and State of Illinois, have invented certain new and useful Improvements in Combined Harvesters and Threshers, of which the following is a full, clear, and exact specification.

This invention relates to combined harvesters and threshers.

It has for its object to improve and simplify the construction of combined harvesters and threshers in such a manner as to render the same more efficient, balance the weight in better proportions between the wheels of the truck, increase the traction of the main wheel, reduce the draft, and at the same time provide a comparatively light machine of compact and rugged construction which is capable of being operated with greater facility. This object is attained by providing an improved harvesting machine combined with an improved thresher, the whole being mounted upon an improved frame and coöperating in an improved manner. More specifically stated, this object is attained by an improved construction and arrangement of the several parts of the machine and specific improvements in the conveyer mechanism, the straw rack construction, the grain pan construction and the separator mechanism, as well as the means for adjusting and controlling the several mechanisms.

In order that this invention may be clearly and fully disclosed, one embodiment thereof is illustrated in the accompanying drawings. It is to be understood, however, that the form shown herein for purposes of illustration is susceptible of modification.

Fig. 2 is a side elevation of the same.

Fig. 3 is a longitudinal sectional view taken on line 3—3 of Fig. 1.

Fig. 4 is a transverse sectional view taken on line 4—4 of Fig. 1.

Fig. 5 is a detail view of the cylinder grate.

Fig. 6 is a longitudinal sectional view on line 6—6 of Fig. 1.

Figure 1:
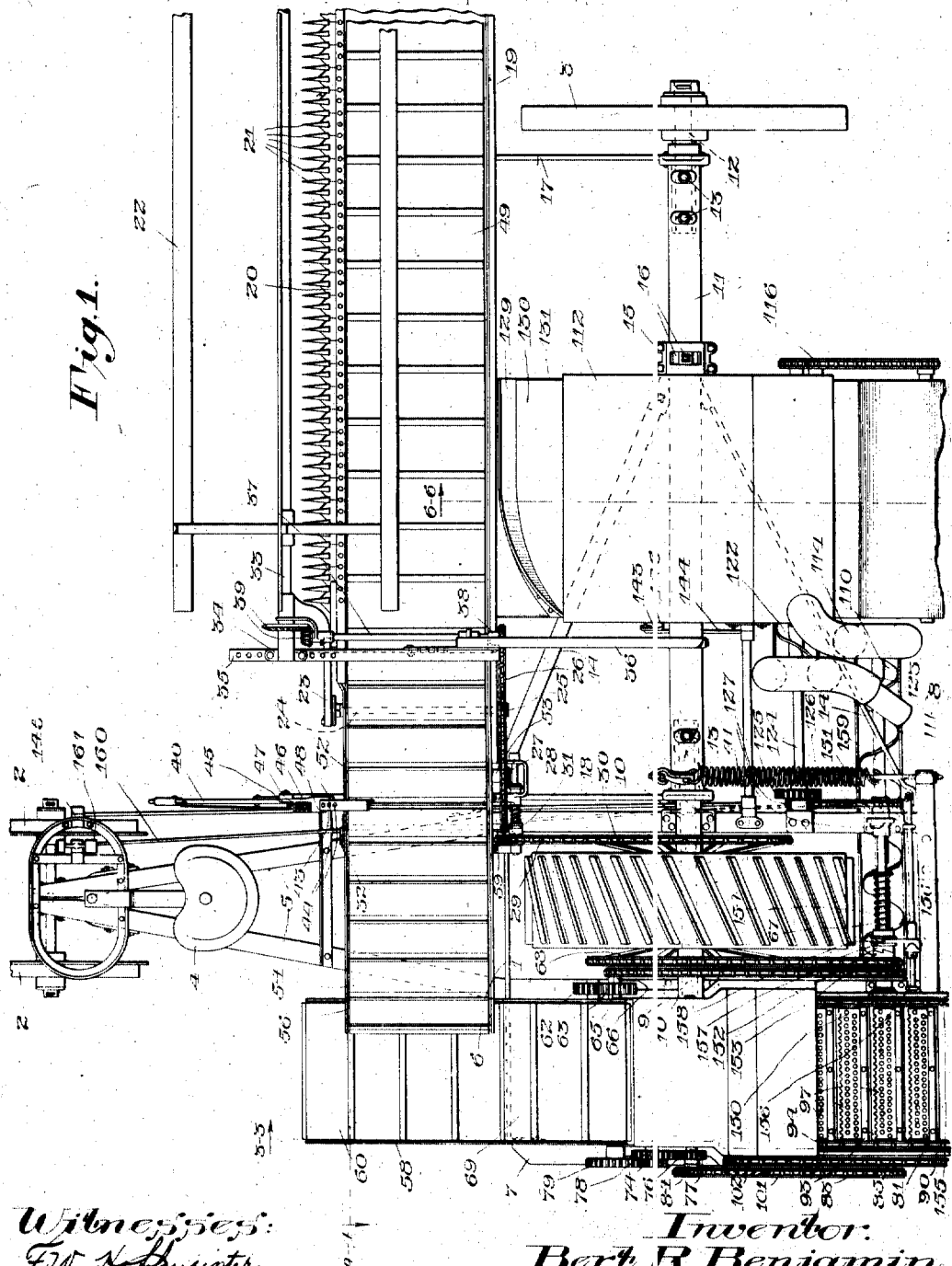
Figure 1 is a top plan view of the machine.

The construction shown, when broadly considered, comprises a frame supported upon a main wheel and truck wheels in front and at one side thereof, cutting apparatus carried by the frame in front of the main wheel and the side truck wheel, a thresher on the stubbleward side of the main wheel extending rearwardly from the cutting apparatus substantially parallel to the main wheel, and a separator carried between the main wheel and the side truck wheel the several parts of the machine being so constructed, combined and controlled as to coöperate in an improved manner and being themselves specifically improved in a manner hereinafter described.

In order that the relation and location of the several mechanisms of the machine may be clearly understood, the truck or frame carrying these parts will be first described.

*The truck or frame.*

The truck shown is of the wheeled type, being mounted upon a main wheel 1 and transport wheels 2 and 3 in front and at the side thereof respectively, and is adapted to be drawn or pulled by any suitable source of power, such as horse power or a tractor, the operator occupying a seat 4 upon the front end thereof substantially over the transport wheels 2.

This frame is shown to be formed of angle material and to comprise a plurality of longitudinally disposed members 5 downwardly bowed between their ends and converging at their front ends where they are rigidly attached together at a point over the tongue truck carrying the transport wheels 2. The rear ends of these members extend rearwardly substantially parallel to each other on opposite sides of the main wheel 1. A transversely extending frame member 6 is rigidly attached to these frame members 5 at a point in front of the main wheel and intermediate their ends and extends beyond the outer one thereof, where it is bent at right angles or attached to another frame member to form a third longitudinally extending member 7 which extends parallel to the rear ends of the members 5 and is connected thereto at its rear end and in back of the main wheel 1 by a second transversely extending member 8 in such a manner that the whole forms a rigid frame.

In this frame the axle 9 of the main wheel is journaled in suitable bearings 10. The grainward end of this axle is seated and positioned in the stubbleward end of a transversely extending tubular axle member 11 which also receives in a like manner in its opposite end the stubbleward end of the axle 12 of the transport wheel 3. It is to be noted that as shown in Fig. 1 both of the axles 9 and 12 are attached to the tubular axle member 11 by means of bolt connections 13 in such a manner as to lock the axles thereto. Attention is further directed to the fact that the tubular axle member 11 is itself rigidly connected to the adjacent frame member 5 by means of converging rigid braces 14 fixed to the inner member 5 at points on opposite sides of the main wheel 1 and having their grainward ends attached to a single bracket 15 carried on the member 11 intermediate its ends and locked thereto by a slot and bolt connection 16 in such a manner as to enable a limited angular movement of the member 11 and the frame with respect to the wheels.

At a point adjacent the side transport wheel 3, a longitudinally extending support 17 is rigidly attached to the axle member 11 and protruded forward therefrom and downward in a plane parallel to the wheel 3, while upon the opposite end of the axle member 11 a second forwardly protruding supporting member 18, parallel to the member 17, is likewise rigidly attached to the axle member 11. Upon the longitudinally disposed front ends of these two members 17 and 18 the cutting mechanism is supported.

The cutting mechanism.

This cutting mechanism is located on the grainward side of the operator's seat 4 and slightly in the rear thereof, in front of the transport wheel 3 and on the grainward side of the main wheel, and, as in the usual construction, extends transversely across the line of draft.

It comprises a transversely disposed frame 19, a knife bar 20 reciprocable thereon between the guard fingers 21 carried on the frame, and a reel 22 journaled above the frame. As shown in Fig. 1, the knife 20 is driven from the main wheel 1 through a pitman connection 23 and a shaft 24. This shaft 24 carries a sprocket 25 on its rear end which engages a chain 26 and is rotated by the latter; the chain being driven through a beveled gear connection 27, journaled in a bracket 28 carried by the frame, and itself driven through a chain 29 suitably connected to the power sprocket 30 on the grainward side of the main wheel. As shown in Fig. 1, this power connection is controlled by a spring clutch controlling mechanism 31; a lever 32 of the usual detent type and operable from the operator's seat 4, being provided to throw the cutting mechanism into or out of connection with the main wheel. The reel 22 is carried on a transversely disposed shaft 33. This shaft is mounted in longitudinally adjustable bearings 34 carried on vertically adjustable supports 35 fixed to the cutter frame and braced on the axle member 11 by a rearwardly extending brace 36. As shown in Figs. 1 and 4, this reel is operatively connected to the main wheel through the same power connection as that which drives the cutter mechanism and is controlled by the same controlling lever 32; the counter-shaft 37 carrying a sprocket 38 on its rear end which engages the chain 26 and is operatively connected to the shaft 33 by a bevel gear connection 39.

This whole cutting apparatus is adjusted vertically with respect to the machine frame, being movable into any desired position about its pivot on the axles 9 and 12 by an operating lever 40, so that it can cut the grain at any desired height or be adapted to use on uneven ground; a spring 41, between the axle member 11 and the frame, normally tending to hold the cutting mechanism in a predetermined elevated position and assisting the operator in raising the same. As shown in Fig. 2, this lever 40 is adjustably pivoted at 42 to the upturned front end of the pivoted support 18 and is provided with a spring detent mechanism operable by the operator to lock or unlock the cutting mechanism in any desired position upon an upstanding arcuate standard 43 fixed to the frame and having a plurality of holes 44 therein adapted to receive the latch 45 of the detent mechanism when the thumb lever thereof is released. As shown in Fig. 2, this latch is carried by a suitable bracket 46 attached to the lever 40 at a point intermediate its ends and provided with an extension 47 through which the pin is movable, as well as spaced lugs 48 movable in sliding engagement with the opposite sides of the standard to guide the lever as the same is moved about its pivot. In order to give increased rigidity to the frame of the machine and to the standard 43, the lower end of the latter is preferably extended transversely across the frame members 5 and rigidly attached thereto as shown in Fig. 1.

As the grain is cut by the knife 20, it is carried along on a traveling apron or conveyer mechanism in a stubbleward and upward direction and is then turned in a rearward direction substantially at right angles thereto and delivered to the threshing machine.

The conveyer mechanism.

This conveyer mechanism is shown to comprise a plurality of transversely disposed conveyers coöperating with a plurality of conveyers moving substantially at right angles thereto; the whole series being so constructed and arranged that the grain is turned as it travels toward the threshing machine and is fed to the latter with its heads toward the cylinder.

The first apron or conveyer 49 of this conveyer mechanism is rotatably mounted upon the cutter frame 19 and movable longitudinally thereof upon rollers 50, 51; the rollers 50 (of which only one is shown) being disposed in a horizontal plane, while the roller 51 is disposed in a plane above the same and located at one side thereof, being journaled in an upwardly and stubblewardly protruding extension 52 on the frame 19 and operatively connected to the main wheel 1 through a sprocket 53. It is here to be noted that the conveyer 49 is so operated that the grain cut by the knife 20 is maintained with its heads toward the rear of the machine.

Receiving the grain from the stubbleward end of this conveyer 49 is a second transversely extending conveyer 54 rotatably mounted on rollers 55 journaled in an adjustable frame 56 pivoted to the extension 52 on the cutter frame and supported by and slidable along a ledge 57 on the adjacent conveyer frame 58. This apron or conveyer 54 is likewise rotated from the main wheel 1 through the power sprocket 30 on the wheel 1, having a sprocket 59 driven from the chain 26. As shown in Fig. 4, this apron or conveyer 54 is considerably shorter than the conveyer 49, being disposed in a substantially horizontal frame across the front of the machine and substantially opposite the main wheel 1.

As shown in Figs. 1 and 4, this conveyer feeds the grain out upon a third conveyer 60 traveling in a direction at right angles thereto and feeding the grain in a rearward direction with its heads to the rear. This conveyer 60 is supported on the front open end of the conveyer frame 58 in a plane parallel to the line of draft outside of the main wheel 1, and is driven by suitable rollers 61 rotatable from the main wheel 1 through pinions 62, 63, chain and sprocket connections 65, 66, and a shaft 67 journaled in the frame and driven by the stubbleward power sprocket 68 on the main wheel. As shown in Fig. 3, this conveyer 60 is disposed at an angle to the horizontal, having its rear end inclined slightly upward and protruding under a fourth conveyer 69.

This fourth conveyer 69 is rotatably mounted on rollers 70, 71 and, driven from the main wheel 1 by the pinion 63. As shown in Fig. 3, this conveyer is shorter than the conveyer 60 and provided with rollers of different diameters disposed substantially parallel to the ground and with the larger one in the rear, the direction of rotation of these rollers being such that the conveyer 69 coöperates with the conveyer 60 in such a manner that the grain fed from the rear end of the latter is compressed and distributed evenly and downwardly heads first to the knives 72 of the thresher cylinder 73.

The threshing mechanism.

As the grain is fed in by the conveyers 60 and 69, it is acted upon by the threshing mechanism, the straw being ejected at the rear of the latter and the threshed grain being fed in a grainward direction transversely of the frame to the separator carried on the frame between the main wheel 1 and the transport wheel 3.

This threshing mechanism is shown to be inclosed in a suitable framework or box 74 mounted outside the main wheel 1 and parallel thereto upon the stubbleward longitudinal frame member 5, the longitudinal frame member 7 and the transverse frame member 6. As shown in Fig. 3, it comprises a cylinder 73, having the usual teeth 72, rotatably mounted in the frame 74 in such a manner as to enable it to coöperate with an underlying grated concave 75 likewise supported in the frame. This cylinder 73 is mounted upon a shaft 76 and rotated through gearing connections 77, 78 and 79 driven from the main wheel 1 through the pinion 63 and the same chain and sprocket connections which drive the conveyers 60 and 69. Adjacent the cylinder 73 and suitably journaled in the thresher frame 74 at a point above the cylinder and in the rear thereof, is a suitable beater 80 which rotates in the same direction as the cylinder and acts upon the straw fed out therefrom to beat the same and also eject the same upon the straw rack 81. As shown in Fig. 3, this beater is mounted upon a suitable shaft 82 journaled in the thresher frame and driven through a chain and sprocket connection 83 operatively connected to the main wheel 1 through spaced sprockets 84, 85 journaled upon the bottom of the frame.

At a point between the straw rack 81 and the cylinder 73, a grate 86 is provided, which is shown in Fig. 5 to comprise a plurality of parallel rearwardly and upwardly disposed spaced metal strips rigidly secured at their inner ends to a cross piece 87 and bent or twisted intermediate their ends in such a manner as to provide a longitudinally slotted grate having parallel slanting surfaces disposed at an angle to the vertical. As shown in Fig. 5, these grate members when thus rigidly secured together, are pivotally mounted upon a suitable rod or shaft 88 journaled in the thresher frame and the free ends of the same are supported in a position substantially parallel to the lower ends of the straw rack 81 by means of stops 89 fixed to the opposite inner walls of the thresher chamber; the straw being freely movable over the ends of the members 86 without striking any obstruction and the grain being free to pass downward through the spaces between these members.

The straw rack 81 receives the straw from this grate and feeds it outward at the rear of the machine and on the stubbleward side of the same. As shown in Figs. 1 and 3, this straw rack is carried in a rack carrier 90 pivotally mounted on a shaft 91 within the rear end of the thresher box and protruding rearwardly therefrom. In the construction shown, this rack carrier is held in a predetermined position by an adjustable strap connection 92 on the rack carrier extending between the same and the top of the thresher frame. Obviously, however, any suitable means may be provided for adjusting the level of this carrier when desired. The straw rack itself, as shown in Figs. 1 and 3, comprises a plurality of spaced transversely extending parallel members or slats 93 connected together by longitudinally extending chains 94 attached to the opposite ends of the slats and rotated by sprockets 95, 96 journaled in the opposite ends of the rack carrier. As shown in Fig. 1, each of the slats 93 is slotted to receive the edge of a transversely extending perforated metal strip 97; the several members 93 being so located that each one of the same and its perforated strip 97 is freely and independently movable in an up and down direction so that the several slats may readily pass around the sprockets at the ends of their travel and be elevated intermediate the same as hereinafter described. It is to be noted that by this improved construction a flexible straw rack is provided which can be very readily and cheaply manufactured and at the same time enables any loose grain mingled with the straw to pass down through the perforations in the members 97 to the bottom of the rack carrier and from there be carried to a suitable receptacle. In order that the straw may be thoroughly separated and fluffed out as it is fed outward on the straw rack, means are provided to raise the rack at intervals in the course of its progress toward the end of the carrier. These means comprise a plurality of rotating cam members 98 operating a plurality of rack lifting levers 99 pivoted to the inner walls of the carrier and underlying the rack, which are driven by the chain 83 through sprockets 100 on the outside of the carrier, chains 101 and a sprocket 102, and act to throw the levers 99 upward about their pivots at intervals and raise the apron or straw rack 81. As shown in Fig. 3, in order to limit the downward movement of these levers 99, suitable blocks or stops 103 may be provided upon the inner walls of the carrier 90.

Operatively connected beneath the concave 75 and the inner end of the straw rack is a grain pan 104 which is so arranged that it receives the grain which drops down through the concave or from the rack carrier or grate. This grain pan is preferably in the form of a metallic grid having a serrated upper and lower surface, disposed in a substantially horizontal plane beneath the elements mentioned and mounted on links 105 pivoted on studs 106 formed on brackets 107 fixed on the under side of the machine frame. As shown herein, it is operated through a crank 108, driven by the chain 83, and journaled in the brackets 107 which are fixed directly below the cylinder 73. This crank is attached to the front end of a pitman connection 109 in such a manner that when the crank is rotated the grain pan is rocked about the lower pivots of the links 105 to feed the grain falling thereon in a rearward direction and into a grain auger 110 located beneath the rear end of the same and extending transversely of the frame.

As shown in Figs. 1 and 2, the grain auger 110 is driven by the sprocket 85 through a shaft 111 and feeds the grain from the grain pan transversly across the machine frame and toward the separator mechanism.

*The separator mechanism.*

This separator mechanism comprises a separator 112 located between the main wheel 1 and the side transport wheel 3 and mounted on a suitable bearing 113 on the tubular axle member 11.

An elevator 114, carried on the stubbleward side of this separator, elevates the grain from the auger 110 and delivers the same at the top of the separator where a second transversely extending auger 115, driven by a sprocket and chain connection 116 on the grainward side of the separator, spreads it out as it is fed into the latter in such a manner that it falls upon a deflector 117 and is spread evenly upon a series of superimposed screens 118. As the grain passes through these screens 118, the separator is rocked in the usual manner by a rocking connection 119 and the grain is acted upon by a draft from a fan 120 located at the rear of the separator box, in such a manner that the dust and dirt is removed therefrom and blown through the front open end of the box, while the clean grain falls upon a finer or weed seed screen 121 beneath the screens 118. As shown in Fig. 6, the three screens 118 are disposed substantially parallel to each other, while the screen 121 is disposed at an angle thereto and slopes toward the rear of the separator, delivering the clean grain to an auger 122 likewise operatively connected to the sprocket and chain connection 116 and acting to deliver the grain to a second grain elevator 123, carried by the separator, which extends toward the rear of the machine and is adapted to deliver the grain either to bags or any suitable grain receptacle. It is to be noted in this connection that the power for the chain and sprocket drive 116 operating the several augers, the rocking connection and fan, is derived from a single transversely extending shaft 124 journaled on the machine frame between the axle member 11 and the auger 110 and driven from the main wheel 1 through pinions 125 and 126, a longitudinally extending chain and sprocket connection 127, and the stub shaft 67 journaled on the rear of the frame and operatively connected with the main wheel 1.

In order that the chaff and refuse separated from the grain by the fan 120 may be suitably deflected to the side of the machine as it is blown out through the open end of the separator, a curved or arc shaped deflector 129 is provided upon the upper surface of a slanting member 130 pivoted at its rear end between the side walls of the separator parts and extending substantially across the mouth of the same. As shown in Fig. 6, this pivoted member 130 is provided with depending parallel flanges 131 on its opposite sides and its free front end is supported upon and freely movable longitudinally of a chute 132 attached to the cutter frame 19 and extending upwardly and rearwardly therefrom. In order that the heads and partially threshed grain, falling through the screens 118 may be again returned to the thresher to separate the grain completely therefrom, the member 130 is provided with a rearwardly extending lip 133 which projects up into the path of the draft to a sufficient degree to intercept the heavier particles blown out thereby and deflect the same downward upon a sliding, second or under chute 134 supported at its free end upon the bottom of the chute 132, and supported at its opposite end by a transversely extending shaft or pipe 135 carried in suitable brackets 136 on the walls of the separator box. It is to be noted that means are thus provided which deflect the chaff and dirt to the side of the machine without permitting it to return to the apron 49 and that supplemental means are provided which deflect the unthreshed grain or heads and cause them to pass through the chute 134 to the conveyer 49 in such a manner that they may again pass through the thresher. It is further to be noted that by the provision of the sliding chute connection means are provided which maintain the chutes in the desired relation in any position of the adjustable cutter mechanism.

In order that uniform cleaning may be obtained despite variations in the speed of the machine and therefore of the fan 120, means are provided for adjusting the screens 118 in the separator box. In order to permit adjustment of these screens, the same are mounted in a suitable frame 137 and this frame is provided with brackets 138 on its front end connected through links 139 on its opposite sides with the pivot shaft or rod 135 of the chute 134. As heretofore described, the rod or shaft 135 is supported in a bracket 136. This bracket is preferably substantially arc shaped and provided with a plurality of teeth 140 on one of its sides and an arcuate slot running along the same in which the rod or shaft 135 may be adjusted as desired, carrying with it the links 139, and therefore the free end of the screen frame 137. This adjustment is obtained through a second link connection 141, having a slotted end through which the end of the shaft 135 extends, which is pivoted at 142 to a crank 143 and operated through a link and crank connection 144 by a lever 145 mounted on the machine frame adjacent the operator's seat. As shown in Fig. 6, the link 143 is pivoted to a shaft 146 journaled in the separator box and provided with an arm 147 protruding at substantially right angles to the link 143. This arm 147 is provided with a flat upper edge or flange 148 underlying the shaft or rod 135 and a coiled spring 149 is connected between the shaft 146 and the rod 135 in such a manner as to normally hold the parts under pressure. Obviously, when the lever 145 is actuated to throw the link 143 in the direction indicated by the arrow (Fig. 6), the arm 147 will be thrown upward in such a manner as to move the rod 135 outward along the slanting face of the ratchet and toward the end of the slot in the link 141, enabling the rod 135, and therefore the chute 134 and screen carrying frame 137, to be adjusted to any desired position in the bracket 136. It is to be noted in this connection that since the chaff deflector 130 is pivoted to the separator box 112, it will remain stationary during the movement of the screen frame 137 and the chute 134 so that the amount of chaff discharged may be varied at will by varying the position of the screens. This feature is of decided importance where the machine is operating at different speeds, such, for instance, as those developed by the main wheel when the machine is passing over uneven ground; the main wheel obviously being rotated more rapidly when going down the hill than when going up the hill, and the fan necessarily being driven faster or slower as the speed of rotation of the main wheel varies. It is to be noted that in this improvement uniform cleaning is obtained regardless of variations in speed and that any desired proportion of the chaff may be returned to the thresher upon the operation of means readily accessible to the operator of the machine.

Both the threshing and separating mechanisms heretofore discussed are driven from the main wheel 1 of the machine through the power sprocket 68 and are controlled through mechanism controlling the connection of their driving mechanism with this sprocket.

*The power controlling mechanism.*

This mechanism is carried upon the rear of the machine frame at a point beyond the main wheel 1 and is controlled through a lever operable from the operator's seat at the front of the machine.

As shown in Fig. 1, the power shaft 67 is journaled in bearings 150, 151 carried upon the rear of the frame, and is controlled by a movable clutch member 152. This clutch member coöperates with a second clutch member 153 freely rotatable on the shaft 67 and is normally held in engagement with this driven member 153 by means of a single spring 154 encircling the shaft. As in the usual construction, the movable clutch member 152 is splined to the shaft and movable longitudinally thereof to cause its active surfaces to engage the surfaces of the driven member. The operating mechanism for this clutch member 152 controlling the connection of the power shaft 67 to the main wheel, comprises a transverse rod 155 journaled in bearings 156 upon the rear of the frame and having a forwardly projecting arm 157 extending into a radial groove 158 on the clutch member 152. This rod or shaft 155 is also provided with an upward extension 159 on its grainward end which is connected through a longitudinally extending link 160 to a foot lever 161 journaled in the frame adjacent the operator's seat in such a manner that when the foot lever is thrown in one direction or the other, the clutch member 152 is thrown into or out of engagement with the driven member 153 and the several mechanisms connected to the power shaft 67 are connected to or disconnected from the main wheel.

In order that the coöperation of the several mechanisms when the machine is operating, may be clearly understood, the operation of the whole machine will now be briefly described.

*Operation of the complete machine.*

Let us assume that the machine is being drawn toward the grain. By manipulating the lever 40 the level of the platform 19 of the cutting apparatus is so adjusted that the knife 20 will cut the grain at the desired height; the platform being swung about its pivot on the axle member 11. By manipulating the lever 32 to throw in the clutch 31, the conveyers 49 and 54 are set in motion, moving in a transverse direction across the frame, and the knife 20 and reel 22 are likewise set in motion. To set the threshing mechanism in operation, the operator presses down the foot lever 161, throwing in the clutch member 152 and connecting the aprons 60 and 69, the threshing mechanism and the separator mechanism to the main wheel through their connection to the shaft 67. As the machine moves forward, the grain is acted upon in the usual manner by the reel and cutting mechanism and fed transversely of the frame upon the apron 49 with its heads to the rear, passing up on the inclined end of the conveyer 49 and onto the second conveyer 54 which continues to feed the grain transversely of the frame and delivers it to the third conveyer 60 which is moving rearwardly at right angles to the conveyer 54 and therefore feeds the grain rearwardly. It is to be noted that due to the construction and arrangement of the conveyers, the heads of the grain are always kept toward the rear. After the grain has passed onto the conveyer 60, it is again fed upward beneath the fourth conveyer 69 which compresses the same and removes bunches therefrom in such a manner that it is evenly distributed, heads first, to the threshing cylinder 73. This cylinder acts upon the grain in the usual manner, the threshed grain falling through the concave 75 and the grate 86 onto the grain pan 104, while the straw is fed outward by the beater 80 to the straw rack 81 by which it is thoroughly fluffed out and separated so that any grain remaining therein falls downward upon the bottom of the rack carrier and is likewise diverted to the grain pan. Obviously, when working under different conditions, the rack carrier may be adjusted to different heights by means of the adjustment of the connection 92. Due to the connection of the grain pan 104 to the main wheel 1 and the mounting of the same, this grain pan is given a to and fro rocking movement about its pivots 106 in such a manner as to feed the grain rearwardly to the auger 110, which in turn transmits it in a transverse direction to the separator elevator 114. This elevator carries the grain to the top of the separator 112 where it is evenly distributed across the screens 118 by the auger 115, being cleaned as it falls between the screens by the action of the fan 120, the chaff and dust being blown out through the open end of the separator box, while the clean grain passes down over the weed screen 121 to the grain auger 122 and by the latter is conducted to the delivery elevator 123. Should the machine be operating upon a down or up grade, the increased or decreased speed of rotation of the fan 120 and its tendency to blow out grain through the open end of the separator box or to fail to clean the grain thoroughly, is compensated for by the adjustment of the screen frame 137 through manipulation of the hand lever 145; the screen frame being so moved about its pivot 119 as to bring the deflector 133 to the desired position opposite the spaces between the screens. Obviously, the chaff and dirt blown out through the open end of the separator box will be deflected to the side and deflected upon the ground by the deflector 129, while the unthreshed grain will be blown out upon the chute 134 and again delivered to the apron 49.

It is to be noted that in this construction a very compact machine is provided which may be readily turned or maneuvered as desired in the field and which may be readily transported to and from the field without making it necessary to take down any of the machine for transport and set it up again before it can be operated. Further, the weight of the machine is so distributed that the far greater proportion of the same rests upon the main wheel 1 in such a manner as to increase the traction of that wheel and reduce waste draft. Further, due to the location of the several parts of the mechanism and the improved manner in which they are connected together and supported upon the frame, an extremely rugged and rigid construction is provided which is well adapted to continued operation under varying conditions such as those found in service. By the provision of the improved feeding mechanism for the thresher, the liability of the grain becoming lodged in such a manner as to choke at the mouth of the cylinder chamber is entirely obviated, the upper apron operating to compress the grain and feed it evenly, heads first, directly into the path of the cylinder teeth. Further, by the provision of the improved grate and straw rack, means are provided which feed the straw out rapidly from the cylinder without clogging and which at the same time thoroughly agitate the same in such a manner that the kernels of grain are effectually separated therefrom before the straw is delivered upon the ground over the rear end of the straw rack. It is further to be noted that the grate, grain pan and straw rack are of an exceedingly simple and rugged construction which may be readily and cheaply manufactured. By the provision of the improved separating mechanism, the grain is effectually cleaned and all variations in the speed of rotation of the fan are effectually overcome; all, or part of the chaff, being returnable to the cutter apron as desired in order to insure saving all the grain. It is further to be noted that due to the sliding connection of the cutting mechanism and the grain screens, either of these elements may be adjusted independently without interfering with the other.

While one form of this invention has been specifically described herein with a view to illustrating the same, it is, of course, to be understood that the embodiment chosen for illustration may be modified without departing from the spirit of the invention.

What I claim as my invention and desire to secure by Letters Patent is:—

1. In a harvester thresher, a frame, a main wheel journaled thereon, cutting, threshing and separating mechanism mounted thereon, and means for conveying the grain transversely in front of said wheel, rearwardly on the stubbleward side thereof through the thresher, transversely in the rear thereof to the separator, and forwardly on the grainward side through said separator.

2. In a combined harvester and thresher, a frame, a main wheel journaled thereon, a rotatable thresher and an oscillatory separator disposed on opposite sides of said main wheel, the axes of said thresher and said separator being disposed parallel to the axis of the main wheel, and transversely disposed conveying mechanism in front and in rear of said main wheel delivering grain respectively to said thresher and separator.

3. In a combined harvester and thresher, a frame, cutting and conveying apparatus disposed transversely thereof, a main wheel journaled thereon, a rotatable thresher and an oscillatory separator disposed on opposite sides of said main wheel, the axes of said thresher and separator being parallel to the axis of the main wheel, conveyer mechanism between said cutting and conveying apparatus and said threshing and separating mechanism, and means for discharging the chaff laterally from the front end of said separator.

4. In a combined harvester and thresher, a frame, a main wheel journaled thereon, a thresher and a separator disposed on opposite sides of said main wheel, and transversely disposed conveying mechanism in front and in rear of said main wheel delivering grain respectively to said thresher and said separator, the path of movement of the grain through said thresher and said separator being parallel to the line of draft.

5. In a combined harvester and thresher, a frame, a main wheel journaled thereon, a thresher and a separator disposed on opposite sides of said main wheel, transversely disposed conveying mechanism in front and in rear of said wheel delivering grain respectively to said thresher and said separator, the path of movement of the grain through said thresher and said separator being parallel to the line of draft, and transversely disposed cutting mechanism disposed in front of certain of said conveying mechanism.

6. In a combined harvester and thresher, a frame, cutting and conveying apparatus disposed transversely thereof, a main wheel journaled in said frame, a thresher receiving the grain from said cutting apparatus disposed at one side of said main wheel, and separator mechanism receiving the grain from said thresher and disposed on the opposite side of said main wheel, the path of movement of the grain through the thresher and the separator being parallel to the line of draft.

7. In a combined harvester and thresher, a frame, cutting and conveying apparatus disposed transversely thereof, a main wheel journaled in said frame, a thresher disposed outside of said main wheel receiving the grain from said cutting apparatus, separator mechanism receiving the grain from said thresher carried on the opposite side of said main wheel, the path of movement of the grain through the thresher and the separator being parallel to the line of draft, and means discharging the straw at the rear of the machine.

8. In a combined harvester and thresher, a frame, a main wheel journaled thereon, cutting and conveying apparatus disposed transversely thereof, a thresher receiving grain from said cutting mechanism carried by said frame on one side of the main wheel, separator mechanism receiving the grain from said thresher and disposed on the opposite side of said main wheel, the path of movement of the grain through the thresher and separator being parallel to the line of draft, and means for returning the unthreshed grain to said conveying apparatus.

9. In a combined harvester and thresher, a main wheel journaled thereon, a thresher and a separator disposed on opposite sides of said main wheel, the thresher being located on the stubbleward side and the separator on the grainward side and delivering in opposite directions and parallel to the line of draft the material acted upon thereby, and conveying mechanism delivering the unthreshed grain to said thresher and the threshed grain to said separator and returning the unthreshed heads to said thresher.

10. In a combined harvester and thresher, a frame, cutting and conveying apparatus disposed transversely thereof, a main wheel journaled thereon, a thresher and a separator disposed on opposite sides of said main wheel, conveyer mechanism between said cutting and conveying apparatus and said threshing and separating mechanism, the path of the grain through said threshing and separating mechanism being parallel to the line of draft, and means for discharging the chaff laterally from the front end of said separator.

11. In a combined harvester and thresher, a frame, cutting and conveying apparatus disposed transversely thereof, a main wheel journaled thereon, a thresher and a separator disposed on opposite sides of said main wheel, conveyer mechanism between said cutting apparatus and said threshing and separating mechanism, the path of movement of the grain through the threshing and separating mechanism being parallel to the line of draft, and means for varying at will the amount of chaff discharged by said separator.

12. In a combined harvester and thresher, a frame, cutting and conveying apparatus disposed transversely thereof, a main wheel journaled in said frame, a thresher receiving the grain from said cutting apparatus and disposed at one side of said main wheel, a separator carried on the opposite side of the main wheel and receiving grain from said thresher, the path of movement of the grain through the thresher and the separator being parallel to the line of draft, means for discharging the straw at the rear of the machine, and means discharging the chaff transversely to the line of draft.

13. In a combined harvester and thresher, a frame, cutting and conveying apparatus disposed transversely thereof, a main wheel journaled in said frame, a thresher disposed at one side of the main wheel, a separator disposed on the opposite side of said main wheel, conveyer mechanism between said cutting apparatus and said threshing and separating mechanism, the path of movement of the grain through the thresher and the separator being parallel to the line of draft, and means intermediate the front end of said separator and said cutting apparatus for discharging laterally the chaff delivered from said separator.

14. In a combined harvester and thresher, a frame, a main wheel mounted thereon, cutting and conveying apparatus disposed transversely thereof, threshing mechanism disposed at one side of said main wheel, separator mechanism disposed on the opposite side of said main wheel from said threshing mechanism, conveyer mechanism conveying the grain to said thresher and separator mechanisms, the path of movement of the grain through the thresher and the separator being parallel to the line of draft, and means for returning to said conveyer mechanism any desired proportion of the tailings from said separator.

15. In a combined harvester and thresher, a frame, cutting apparatus disposed transversely thereof, a main wheel journaled in said frame, threshing mechanism disposed on one side of said main wheel, separator mechanism disposed on the opposite side of said main wheel, conveyer mechanism between said cutting apparatus and said thresher and separator mechanisms, the path of movement of the grain through the thresher and the separator being parallel to the line of draft, means for returning to said conveyer mechanism chaff from said separator, and means delivering the threshed straw in the line of draft.

16. In a combined harvester and thresher, a frame, a main wheel journaled thereon, cutting apparatus disposed transversely thereof, conveyer mechanism delivering the grain in a transverse direction, supplementary conveyer mechanism delivering the grain in a rearward direction, threshing mechanism carried by said frame at one side of the main wheel and acting on said grain, means for separating the threshed grain from the straw, means for conveying the threshed grain in an opposite direction from the first mentioned conveyer mechanism, means delivering the straw in a direction substantially at right angles to said conveyer mechanism, and a separator carried on said frame at the rear of said cutting apparatus, the path of movement of the grain through the threshing and separating mechanisms being parallel to the line of draft.

17. In a combined harvester and thresher, a frame, cutting apparatus disposed transversely thereon, conveyer mechanism delivering the grain in a transverse direction, supplementary conveyer mechanism delivering the grain in a rearward direction, threshing mechanism carried by said frame and acting on said grain, means conveying the threshed grain in an opposite direction from the first mentioned conveyer mechanism, means delivering the straw in a direction substantially at right angles to said cutting mechanism, a separator carried on said frame at the rear of said cutting apparatus, the path of movement of the grain through the thresher and the separator being parallel to the line of draft, and means discharging the chaff laterally from said separator.

18. In a combined harvester and thresher, a frame, a main wheel rotatably mounted on one side thereof, a transport wheel carried by said frame and spaced apart from said main wheel, a tongue truck carried by said frame and disposed substantially in front of said main wheel, cutting and conveying apparatus disposed across the front of said frame, threshing mechanism receiving the cut grain from said cutting and conveying mechanism arranged outside of said main wheel, separator mechanism disposed between said main wheel and said transport wheel, the path of movement of the grain through the threshing mechanism and separator mechanism being parallel to the line of draft, and means for conveying the threshed grain from said threshing mechanism to said separator mechanism.

19. In a combined harvester and thresher, a frame, a main wheel rotatably mounted on one side thereof, a transport wheel carried by said frame and spaced apart from said main wheel, a tongue truck carried by said frame and disposed substantially in front of said main wheel, cutting and conveying apparatus disposed across the front of said frame, longitudinally disposed conveying and threshing mechanism arranged outside of said main wheel, oscillatory separator mechanism disposed between said main wheel and said side transport wheel having its axis parallel to the axis of the thresher mechanism and axis of the main wheel, and straw discharging mechanism discharging the threshed straw parallel to the line of draft.

20. In a combined harvester and thresher, a rigid longitudinally disposed frame, a transversely disposed axle member thereon, a main wheel rotatably mounted on one end of said axle member, a transport wheel rotatably mounted on the other end of said axle member, rotatable threshing mechanism carried by said frame and disposed with its axis parallel to the axis of said main wheel and at one side thereof, a supplemental frame angularly adjustable with respect to said main frame and journaled on said axle member between said transport wheel and said main wheel, cutting apparatus carried on said supplemental frame, and adjustable conveyer mechanism delivering to said thresher mechanism the grain cut by said cutting apparatus.

21. In a combined harvester and thresher, a main frame, a supplemental cutter frame adjustable with respect thereto, conveyer mechanism on said supplemental frame, separator mechanism carried on said main frame, means for adjusting said cutter frame with respect to said separator, and tailings delivering means carried by the main frame intermediate said separator and said conveyer mechanisms automatically adjustable as said cutter frame is adjusted to maintain its coöperative relation therewith.

22. In a combined harvester and thresher, a frame, a supplemental frame journaled thereon and angularly adjustable with respect thereto, a separator carried on said main frame, cutting mechanism carried on said supplemental frame, a conveyer mechanism movable longitudinally of said cutting mechanism, and telescoping chute connections between said conveyer mechanism and said separator for returning to the former the unthreshed grain.

23. In a combined harvester and thresher, a frame, a supplemental frame journaled thereon and angularly adjustable with respect thereto, a separator carried on said main frame, cutting mechanism carried on said supplemental frame, a conveyer mechanism movable parallel to said cutting mechanism, screens carried within said separator, means for adjusting said screens, and automatically adjustable delivery mechanism connecting the delivery end of said separator with said conveyer mechanism.

24. In a combined harvester and thresher, a frame, a supplemental frame angularly adjustable with respect thereto, a separator carried on said main frame, cutting mechanism carried on said supplemental frame, conveyer mechanism movable parallel to said cutting mechanism, screens carried within said separator, a chute connecting said separator and said conveyer mechanism, and means for simultaneously adjusting said screens and said chute.

In testimony whereof I affix my signature, in the presence of two witnesses.

BERT R. BENJAMIN.

Witnesses:
F. W. HOFFMEISTER,
H. L. ECKEL.